(12) United States Patent
Han et al.

(10) Patent No.: US 8,190,726 B2
(45) Date of Patent: May 29, 2012

(54) UPNP REMOTE ACCESS SERVER AND METHOD OF SUPPORTING MULTIPLE REMOTE ACCESSES

(75) Inventors: Se-hee Han, Seoul (KR); Seong-ho Cho, Seoul (KR); Sang-hyeon Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 108 days.

(21) Appl. No.: 12/320,070

(22) Filed: Jan. 15, 2009

(65) Prior Publication Data

US 2009/0210555 A1 Aug. 20, 2009

Related U.S. Application Data

(60) Provisional application No. 61/021,227, filed on Jan. 15, 2008.

(30) Foreign Application Priority Data

Aug. 20, 2008 (KR) .......................... 10-2008-0081367

(51) Int. Cl.
*G06F 15/173* (2006.01)
(52) U.S. Cl. ........ 709/223; 709/203; 709/220; 709/248; 709/249
(58) Field of Classification Search .................. 709/223, 709/203, 220, 238, 248, 249
See application file for complete search history.

(56) References Cited

U.S. PATENT DOCUMENTS

| | | | |
|---|---|---|---|
| 6,333,951 B1 * | 12/2001 | Tamura et al. ........... | 375/240.25 |
| 6,499,054 B1 | 12/2002 | Hesselink et al. | |
| 6,553,375 B1 * | 4/2003 | Huang et al. .......................... | 1/1 |
| 7,725,566 B2 * | 5/2010 | Stirbu ............................ | 709/220 |
| 2005/0160172 A1 | 7/2005 | Eytchison | |
| 2006/0031459 A1 * | 2/2006 | Ahn et al. ...................... | 709/224 |
| 2006/0173974 A1 * | 8/2006 | Tang .............................. | 709/217 |
| 2007/0064653 A1 * | 3/2007 | Jang et al. ...................... | 370/331 |
| 2007/0071012 A1 * | 3/2007 | Park et al. ................ | 370/395.53 |
| 2007/0162981 A1 * | 7/2007 | Morioka et al. ................ | 726/30 |
| 2007/0214241 A1 | 9/2007 | Song et al. | |
| 2007/0226312 A1 * | 9/2007 | Stirbu et al. ................... | 709/217 |

(Continued)

FOREIGN PATENT DOCUMENTS

EP 1742153 1/2007

(Continued)

OTHER PUBLICATIONS

Belimpasakis, P. et al., "Remote Access to Universal Plug and Play (UPnP) Devices Utilizing the Atom Publishing Protocol", IN: Third International Conference on Networking and Services, Jun. 19-25, 2007, pp. 59-64.

(Continued)

*Primary Examiner* — Alina N. Boutah
(74) *Attorney, Agent, or Firm* — Staas & Halsey LLP (57) ABSTRACT

Provided is a communication method of a universal plug and play (UPnP) remote access server (RAS), the communication method including: accepting a plurality of remote access connections from UPnP devices of a plurality of remote networks; collecting device list information about devices discovered in the plurality of remote networks and a home network of the RAS; generating synchronization information to synchronize the collected device list information between the plurality of remote networks; and transmitting the synchronization information to the UPnP devices of the plurality of remote networks.

20 Claims, 5 Drawing Sheets

U.S. PATENT DOCUMENTS

| | | | |
|---|---|---|---|
| 2007/0255834 A1* | 11/2007 | Abhishek et al. | 709/226 |
| 2008/0005358 A1* | 1/2008 | Kwon et al. | 709/248 |
| 2008/0104142 A1* | 5/2008 | Oh et al. | 707/203 |
| 2008/0104249 A1* | 5/2008 | Oh et al. | 709/226 |
| 2009/0080453 A1* | 3/2009 | Stirbu | 370/433 |
| 2009/0123131 A1* | 5/2009 | Morioka | 386/124 |
| 2009/0150975 A1* | 6/2009 | Cho et al. | 726/3 |
| 2009/0164667 A1* | 6/2009 | Zhang et al. | 709/248 |
| 2009/0239545 A1* | 9/2009 | Lee et al. | 455/450 |
| 2009/0288125 A1* | 11/2009 | Morioka | 725/110 |
| 2010/0061288 A1* | 3/2010 | Yun et al. | 370/312 |
| 2010/0070636 A1* | 3/2010 | Skog et al. | 709/228 |
| 2010/0191829 A1* | 7/2010 | Cagenius | 709/219 |
| 2010/0205309 A1* | 8/2010 | Skog et al. | 709/227 |

FOREIGN PATENT DOCUMENTS

| | | |
|---|---|---|
| KR | 10-2004-0055446 | 6/2004 |
| KR | 10-2005-0015528 | 2/2005 |
| KR | 10-2005-0086734 | 8/2005 |
| WO | WO 2004/046852 | 6/2004 |
| WO | 2007/063408 | 6/2007 |
| WO | 2007/110754 | 10/2007 |

OTHER PUBLICATIONS

Dong-Sung Kim et al., "Design and Implementation of home server system using UPnP middleware", IN: International Conference on Consumer Electronics, 2002 Digest of Technical Papers Jun. 8-20, 2002, pp. 106-107.

International Search Report mailed Aug. 25, 2009 and issued in corresponding International Patent Application PCT/KR2009/000226.

Extended European Search Report dated Mar. 6, 2012, in European Patent Application No. 09702330.3-2416.

* cited by examiner

UPNP REMOTE ACCESS SERVER AND METHOD OF SUPPORTING MULTIPLE REMOTE ACCESSES

CROSS-REFERENCE TO RELATED APPLICATIONS

This application claims the benefits of U.S. Provisional Application No. 61/021,227, filed on Jan. 15, 2008, in the USPTO and Korean Patent Application No. 10-2008-0081367, filed on Aug. 20, 2008, in the Korean Intellectual Property Office, the disclosures of which are incorporated herein in their entirety by reference.

BACKGROUND

1. Field

The present invention relates to a universal plug and play (UPnP) remote access server (RAS) and method of supporting multiple remote accesses, and more particularly, to an UPnP RAS and method of supporting multiple remote accesses for UPnP devices of a plurality of remote networks by enabling an RAS of a home network to accept a remote access connection from the UPnP devices of the plurality of remote networks, synchronizing network images between the networks, and routing a device control message.

2. Description of the Related Art

With the recent popularity of home networks, a conventional PC network-oriented environment increasingly extends to an environment including home appliances using various lower network techniques. Therefore, a universal plug and play (UPnP) technology has been proposed in order to network these home appliances in a unified manner by using an Internet protocol (IP). The UPnP device architecture 1.0 enables home appliances to be peer-to-peer networked on the basis of a distributed and open networking structure instead of being under centralized control.

The UPnP device architecture 1.0 uses the distributed and open networking to discover a UPnP device via an IP multicast in a home network. However, an IP multicast service is not guaranteed to be normally provided within the range of the Internet, making it impossible to control the UPnP device via the Internet since such control of the UPnP device needs information obtained by discovering the UPnP device.

Therefore, a UPnP remote access architecture has been proposed to allow the UPnP device or a control point (CP) to operate normally as if both are physically in the same network, even when the UPnP device or the CP is physically separated far from the home network. The UPnP remote access architecture defines a remote access server (RAS) within the home network and a remote access client (RAC) within a remote network.

SUMMARY

The present embodiments provide a universal plug and play (UPnP) remote access server (RAS) and method of supporting multiple remote accesses for UPnP devices of a plurality of remote networks.

Additional aspects and/or advantages will be set forth in part in the description which follows and, in part, will be apparent from the description, or may be learned by practice of the invention.

The foregoing and/or other aspects are achieved by providing a communication method of a universal plug and play (UPnP) remote access server (RAS), the communication method including: accepting a plurality of remote access connections from UPnP devices of a plurality of remote networks; collecting device list information about devices discovered in the plurality of remote networks and a home network of the RAS; generating synchronization information to synchronize the collected device list information between the plurality of remote networks; and transmitting the synchronization information to the UPnP devices of the plurality of remote networks.

The synchronization information may be tree data structure information including a plurality of remote network images and a home network image, the home network image including a list of devices discovered in the home network, and the plurality of remote network images including a list of devices discovered in the plurality of remote networks.

The collecting of the device list information may include: receiving device list information about devices discovered in the plurality of remote networks from the UPnP Control Points (CPs) of the plurality of remote networks; and collecting device list information about devices discovered in the home network.

The collecting of the device list information, the generating of the synchronization information, and the transmitting of the synchronization information may be re-performed when a change occurs in the discovered device list information because a new UPnP device joins or an existing device leaves the plurality of remote networks or the home network.

The communication method may further include routing a UPnP device control action message, which is received from a UPnP CP of a remote network and controls a UPnP device of other remote network, to the other remote network.

The UPnP devices may be UPnP remote access clients (RACs) or UPnP RASs.

The accepting of the plurality of remote access connections and the transmitting of the synchronization information may be selectively performed depending on user settings.

The routing of the UPnP device control action message may be selectively performed depending on user settings.

The foregoing and/or other aspects are achieved by providing a recording medium having embodied thereon a computer program to cause a computer to execute the communication method.

The foregoing and/or other aspects are achieved by providing a UPnP RAS, including: a connection accepting unit accepting a plurality of remote access connections from UPnP devices of a plurality of remote networks; an information collecting unit collecting device list information about devices discovered in the plurality of remote networks and a home network of the RAS; a synchronization information generating unit generating synchronization information to synchronize the device list information between the plurality of remote networks; and a synchronization information transmitting unit transmitting the synchronization information to the UPnP devices of the plurality of remote networks.

BRIEF DESCRIPTION OF THE DRAWINGS

The above and other features and advantages will become more apparent by describing in detail embodiments thereof with reference to the attached drawings in which.

DETAILED DESCRIPTION OF EMBODIMENTS

The present invention will now be described more fully with reference to the accompanying drawings, in which embodiments of the invention are shown. In the drawings, like reference numerals denote like elements, and the thicknesses of elements are exaggerated for clarity.

Figure 1:
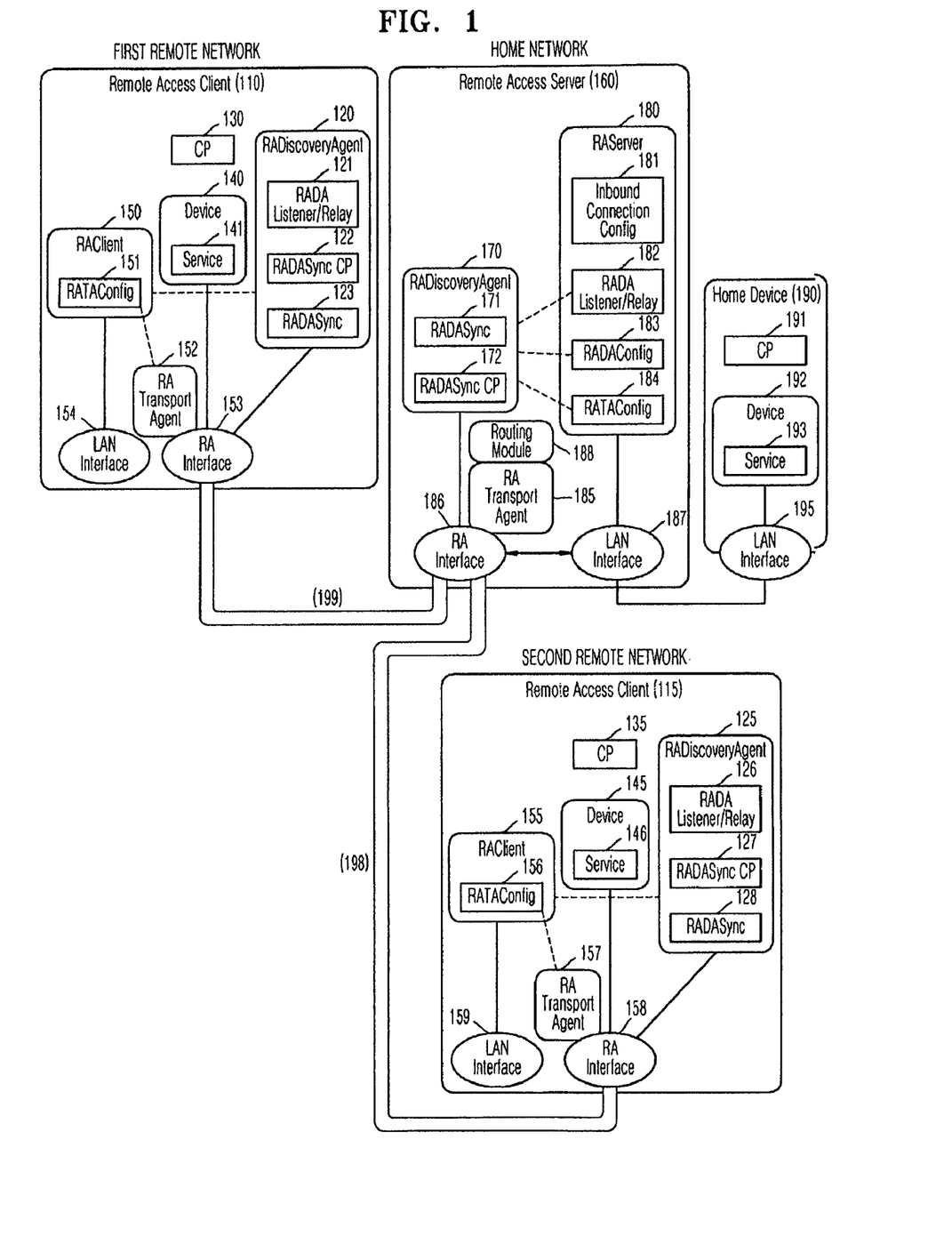
FIG. 1 is a schematic diagram of a universal plug and play (UPnP) multiple remote access architecture environment supporting a plurality of remote accesses, according to an embodiment.

FIG. 1 is a schematic diagram of a universal plug and play (UPnP) multiple remote access architecture environment supporting a plurality of remote accesses, according to an embodiment. Remote access clients (RACs) 110 and 115 and a remote access server (RAS) 160 in the UPnP remote access architecture environment of FIG. 1 will be first explained and then a remote access discovery agent synchronization (RADASync) module 171, a RADASync CP (Control Point) 172, a routing module 188, and remote access transport agents (RATAs) 152, 157, and 185 will be explained in detail.

The RAS 160 and a home device 190 are UPnP devices located in a home network and are connected to each other using LAN interface 187, 195. The RACs 110 and 115 are UPnP devices located in first and second remote networks away from the home network.

The RATAs 152, 157, and 185 provide a secured communication channel between the RACs 110 and 115 and the RAS 160. In general, a virtual private network (VPN) is used to embody the secured communication channel. In particular, the RATA 185 of the RAS 160 can accept a plurality of remote access connections from the RACs 110 and 115 of the first and second remote networks. A connection accepting unit to accept a plurality of remote access connections may be included in the RATA 185, but other service in the RAS 160 may be included. The routing module 188 routes a UPnP device control action message, which is received from a UPnP CP of the first remote network and controls a UPnP device of the second remote network, to the second remote network.

A management console (not shown) provides parameters necessary to set remote access transport channels (RATCs) 198 and 199 by using RATA Config services 151, 156, and 184. The RATA Config services 151, 156, and 184 are provided by the RACs 110 and 115 and the RAS 160, and the management console is a CP including a user interface.

In general, since the RACs 110 and 115 begin remote accesses using the RATAs 152 and 157, the RAS 160 of the home network should be discoverable and reachable over the Internet. An InboundConnectionConfig service 181 provides an interface so that a network manager can configure settings necessary for the RACs 110 and 115 to establish the RATCs 199, and 198 to the RAS 160 through remote access interfaces 153, 158 and 186.

Remote access discovery agents (RADAs) 120, 125, and 170, which perform a discovery operation in the UPnP network, synchronize network images of a list of devices 192, 140 and 145 discovered in the home network and the plurality of remote networks between the home network and the plurality of remote networks. The synchronizing of the network images is that devices 192, 140 and 145 and services 193, 141 and 146 discovered by the RAS 160 after the discovery operation is performed and devices 192, 140 and 145 and services 193, 141 and 146 recognized by the RACs 110 and 115 are the same as each other, respectively. To this end, the RADAs 120, 125, and 170 define RADAListener/Relay modules 121, 126, and 182, which are logic function modules.

The RADAListener module 182 monitors a simple service discovery protocol (SSDP) message, and when a device joins or leaves the home network, provides the RADA 170 with information about the joining or leaving device. An information collecting unit to collect device list information about devices discovered in the home network may be included in the RADAListener/Relay module 182, but other service in the RAS 160 may be included. The RADARelay modules 121 and 126 may relay a periodic SSDP announcement message with regard to each device of a network image of each of the first and second remote networks, an expiration message when a device is removed, a multicast event message when the network image is changed, etc., to the home network to which the RADARelay modules 121 and 126 belong. The RADARelay modules 121 and 126 respond to a SSDP query (M-Search) of devices in the home network with respect to devices in the first and second remote networks.

The RADASync module 171 of the RAS 160 collects device list information about the devices discovered in the home network and the first and second networks from the RADAListener/Relay module 182 of the RAS 160, a RADASync CP 122 of the RAC 110 of the first remote network, and a RADASync CP 127 of the RAC 115 of the second remote network respectively. The RADASync module 171 of the RAS 160 generates tree data structure synchronization information including a plurality of remote network images and a home network image. The home network image includes a list of the devices discovered in the home network, and the plurality of remote network images include lists of the devices discovered in the first and second networks. The information collecting unit may be included in the RADASync module 171 and the RADAListener module 182, but other service in the RAS 160 may be included. A synchronization information generating unit may be included in the RADASync module 171, but other service in the RAS 160 may be included.

The RADASync CP 172 of the RAS 160 synchronizes the network images by transmitting the network images including the lists of the devices discovered in the home network and the first and second remote networks to the RACs 110 and 115 of the plurality of remote networks. The RADASync CP 172 of the RAS 160 may transmit a network image including a newly discovered device or service to the RACs 110 and 115 by using an AddRemoteDevice( ) action that is provided by RADASync services 123 and 128 of the RACs 110 and 115. A synchronization information transmitting unit to synchronize network images with respect to multiple remote access connections may be included in the RADASync CP 172, but other service in the RAS 160 may be included.

If a network image needs to be transmitted to the RAC 110 of the first remote network or the RAC 115 of the second remote network, the synchronization information transmitting unit may transmit other network images than a network image corresponding to the first remote network or the second network, respectively.

Each of the RACs 110 and 115 includes a CP 130 and 135. The RAS 160 includes a RADAConfig 183. Each of the RACs 110 and 115 includes a local area network (LAN) interface 154 and 159. The home device 190 includes a CP 191 and an LAN interface 195.

Figure 2:
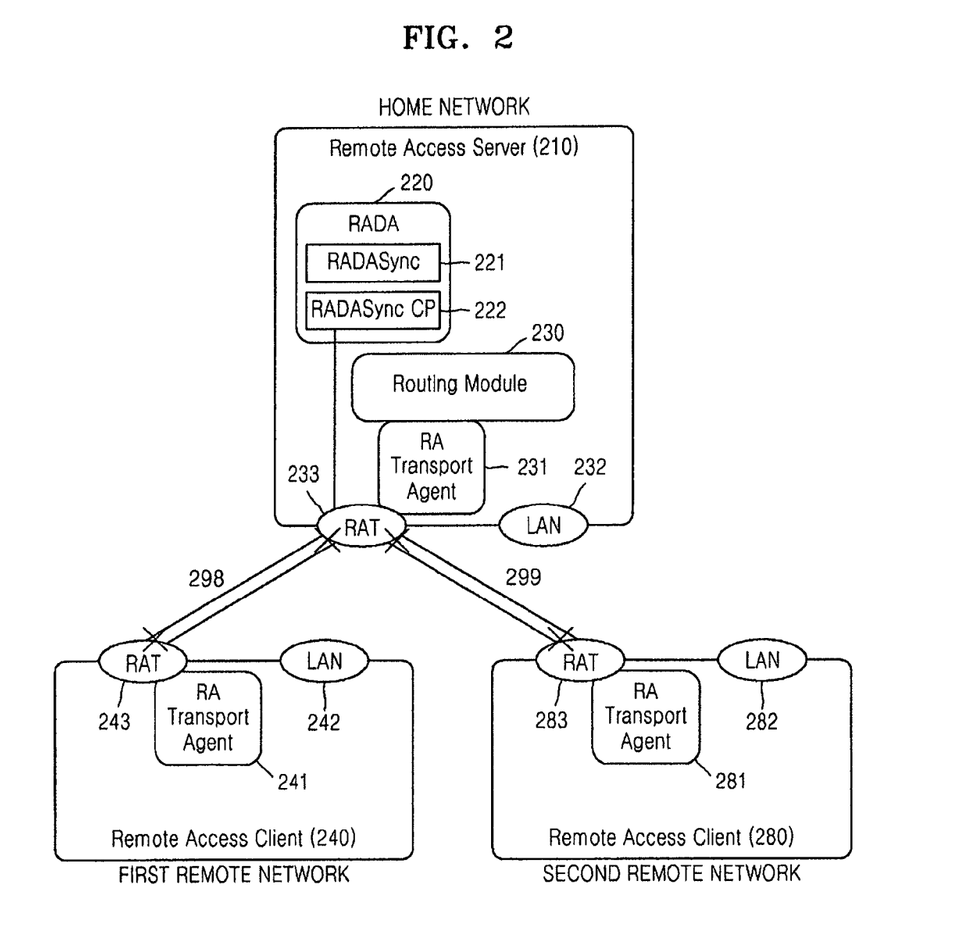
FIG. 2 is a schematic diagram of a UPnP remote access server (RAS) to support remote accesses for a plurality of remote access clients (RACs), according to an embodiment.

FIG. 2 is a schematic diagram of a UPnP RAS 210 to support remote accesses for a plurality of RACs, according to an embodiment. A connection accepting unit of the UPnP RAS 210 accepts a plurality of remote access connections 298 and 299 from RACs 240 and 280 of first and second remote networks. The connection accepting unit which accepts the plurality of remote access connections 298 and 299 may be included in a RATA 231, but other service in the UPnP RAS 210 may be included.

An information collecting unit of the UPnP RAS 210 collects device list information about devices discovered in a home network and the first and second remote networks from a RADAListener module (not shown) of the UPnP RAS 210, a RADASync CP (not shown) of an RAC 240 of the first remote network, and a RADASync CP (not shown) of an RAC 280 of the second remote network. A synchronization information generating unit of the UPnP RAS 210 generates tree data structure information including a plurality of remote network images and a home network image. The home network image includes a list of the devices discovered in the home network, and the plurality of remote network images include a list of the devices discovered in the first and second networks. The information collecting unit may be included in a RADASync module 221, which is part of a RADA 220, and the RADAListener module, but other service in the UPnP RAS 210 may be included. Also, the synchronization information generating unit may be included in the RADASync module 221, but other service in the UPnP RAS 210 may be included.

A synchronization information transmitting unit of the UPnP RAS 210 synchronizes the network images including the lists of the devices discovered in the home network and the first and second remote networks to the RACs 240 and 280 of the first and second remote networks. A RADASync CP 222 of the UPnP RAS 210 may transmit a network image including a newly discovered device or service to the RACs 240 and 280 by using an AddRemoteDevice( ) action provided by RADASync services (not shown) of the RACs 240 and 280. The synchronization information transmitting unit that synchronizes network images with respect to a plurality of remote access connections may be included in the RADASync CP 222, but other information in the UPnP RAS 210 may be included.

A routing module 230 of the UPnP RAS 210 routes a UPnP device control action message, which is received from a UPnP CP of the first remote network and controls a UPnP device of the second remote network, to the second remote network.

As described above, since the remote access connections 298 and 299 from the RACs 240 and 280 are accepted, device and service information about the devices and services discovered in the home network and the first and second networks is synchronized, and a control packet is routed, the UPnP devices can be discovered and controlled independently of their physical network location. In particular, since the device of the first remote network is a UPnP CP, the devices of the second network and the home network are UPnP devices, if they operate as a 3-box model, that is, if the UPnP CP can search for the two UPnP devices and control operations of the two UPnP devices, various user scenarios based on 3-box model can be supported.

Each of the RAS 210 and the RACs 240 and 280 provides for remote access transport (RAT) 233, 243 and 283 to/from the RAS 210 and the RACs 240 and 280. The RACs 240 and 280 include RATAs 241 and 281. The RAS 210 and the RACs 240 and 280 each include a LAN 232, 242 and 282.

Figure 3:
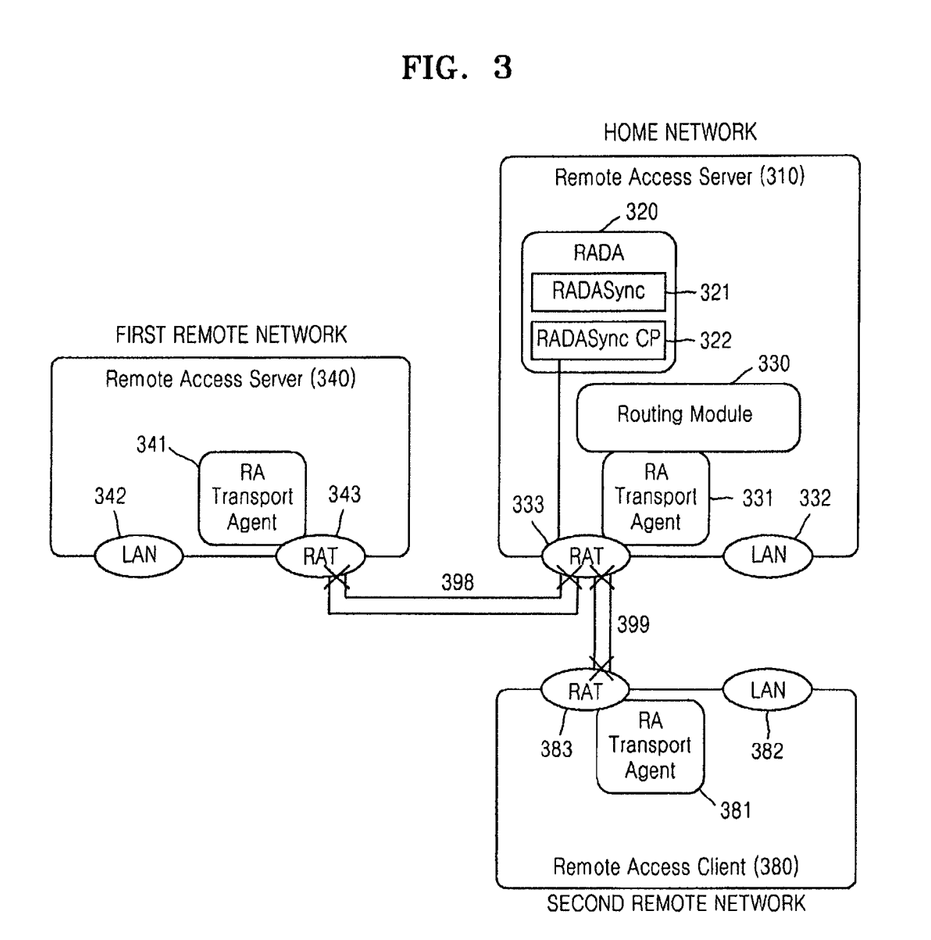
FIG. 3 is a schematic diagram of a UPnP RAS to supporting remote accesses for an RAC and an RAS, according to another embodiment.

FIG. 3 is a schematic diagram of a UPnP RAS 310 to support remote accesses for an RAC 380 and an RAS 340, according to another embodiment. Since a home network and a first remote network are respectively connected to RASs via one VPN tunnel, remote access services can be provided to the home network and the first remote network. Accordingly, a connection accepting unit of the UPnP RAS 310 accepts a plurality of remote access connections 398 and 399 from the RAS 340 of the first remote network and the RAC 380 of a second remote network. The connection accepting unit that accepts the remote access connections 398 and 399 may be included in a RATA 331, but other service in the UPnP RAS 310 may be included.

An information collecting unit of the UPnP RAS 310 collects device list information about devices discovered in the home network and the first and second remote networks from a RADAListener module (not shown) of the UPnP RAS 310, a RADASync CP (not shown) of the RAS 340 of the first remote network, and a RADASync CP (not shown) of the RAC 380 of the second remote network. A synchronization information generating unit of the UPnP RAS 310 generates tree data structure information including a plurality of remote network images and a home network image. The home network image includes a list of the devices discovered in the home network, and the plurality of remote network images include a list of the devices discovered in the first and second remote networks. The information collecting unit may be included in a RADASync module 321, which is part of a RADA 320, and the RADAListener module (not shown), but other service in the UPnP RAS 310 may be included. Also, the synchronization information generating unit may be included in the RADASync module 321, but other service in the UPnP RAS 310 may be included.

A synchronization information transmitting unit of the UPnP RAS 310 synchronizes the network images including the lists of the devices discovered in the home network and the first and second remote networks by transmitting the network images to the RAS 340 of the first remote network and the RAC 380 of the second remote network. A RADASync CP 322 of the UPnP RAS 310 of the home network may transmit a network image including a newly discovered device or service to the RAS 340 of the first remote network and the RAC 380 of the second remote network by using an AddRemoteDevice( ) action provided by RADASync services (not shown) of the RAS 340 of the first remote network and the RAC 380 of the second remote network. The synchronization information transmitting unit to synchronize the network images with respect to the remote access connections 398 and 399 may be included in the RADASync CP 322, but other service in the UPnP RAS 310 may be included.

A routing module 330 of the UPnP RAS 310 routes a UPnP device control action message, which is received from a UPnP CP of the first remote network and controls a UPnP device of the second remote network, to the second remote network.

As described above, since the remote access connections 398 and 399 from the RAC 380 and the RAS 340 are accepted, device and service information about the devices discovered in the home network and the first and second remote networks is synchronized, and a control packet is routed, the UPnP devices can be discovered and controlled independently of their physical network location. In particular, since remote accesses are allowed between the home network and the first remote network by using one VPN tunnel, a UPnP service can be provided as if one physical network is used. Also, since the remote access connection 399 from the UPnP device of the second remote network is also accepted, various user scenarios based on a 3-box model can be supported between the UPnP devices of the home network, the first remote network, and the second remote network.

Each of the RASs 310 and 340 and the RAC 380 provides for remote access transport (RAT) 333, 343 and 383 to/from the RASs 310 and 340 and the RAC 380. The RAS 340 and the RAC 380 include RATAs 341 and 381. The RASs 310 and 340 and the RAC 380 each include a LAN 332, 342 and 382.

Figure 4:
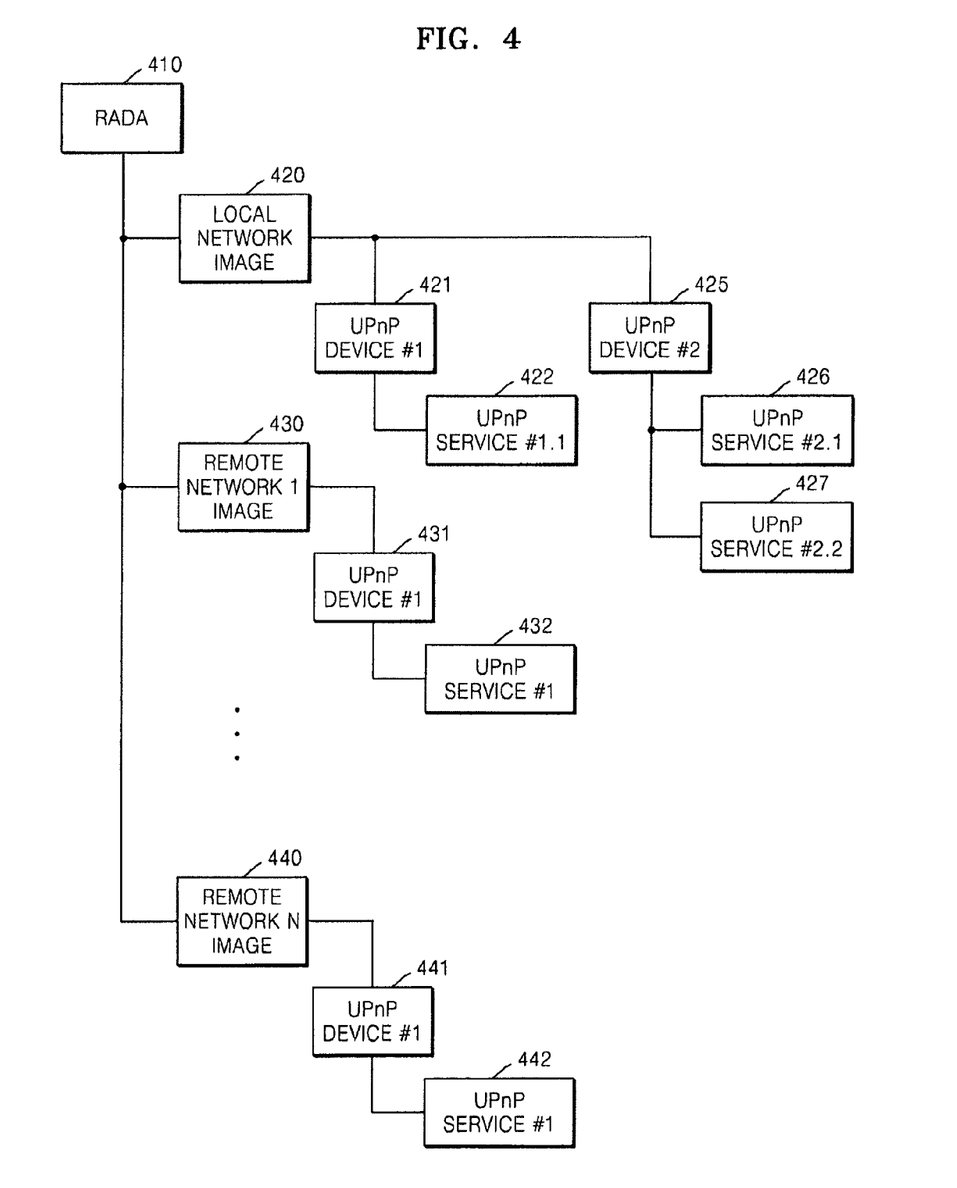
FIG. 4 is a block diagram illustrating synchronized network images according to an embodiment.

FIG. 4 is a block diagram illustrating synchronized network images according to an embodiment. Referring to FIG. 4, UPnP devices 421, 425, 431 and 441 and UPnP services 422, 426, 427, 432 and 442 within a local network 420 and a plurality of remote networks 430 through 440 are recognized by a RADA 410 as if they are located in one physical UPnP network. To this end, if a new device or service is added to the local network 420, a RADASync CP of an RAS transmits the newly added device or service to an RAC of each of the remote networks by using an AddRemoteDevice( ) action provided by a RADA Sync service of the RAC of each of the remote networks. The RAC of each of the remote network adds the newly added device or service in the local network 420 to its own network image.

If a device or service is removed from the local network 420, the RADASync CP of the RAS transmits the removed device or service to the RAC of each of the remote networks by using a RemoveRemoteDevice( ) action provided by the RADA Sync service of the RAC of each of the remote networks. The RAC of each of the remote networks removes the removed device or service in the local network 420 from its own remote network image.

Figure 5:
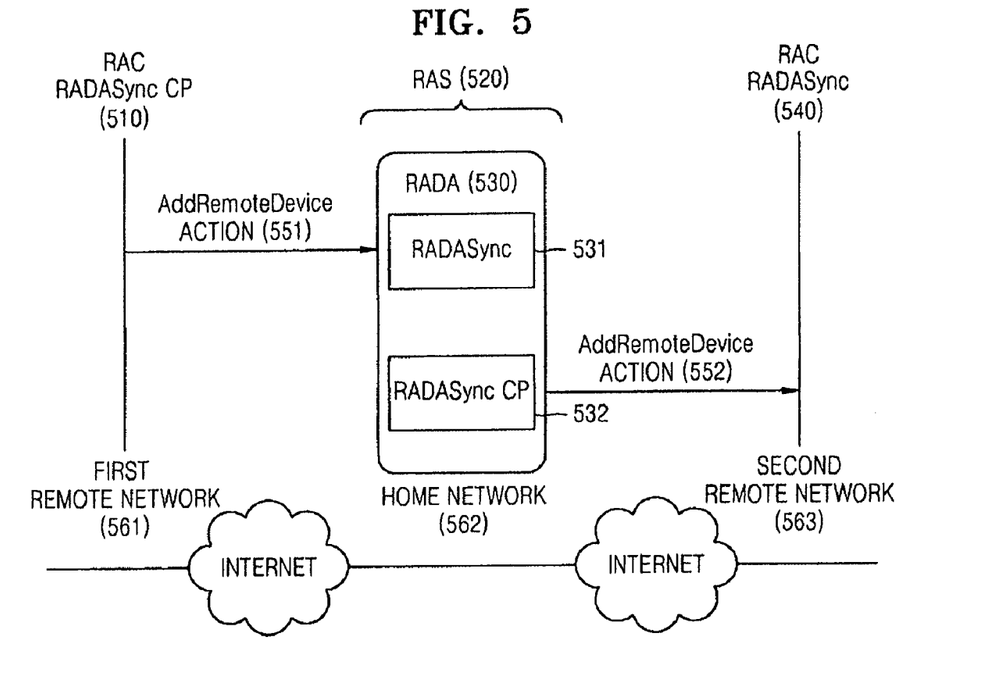
FIG. 5 illustrates a process of synchronizing network images between a plurality of remote networks and a home network, according to an embodiment.

FIG. 5 illustrates a process of synchronizing network images between a plurality of remote networks and a home network, according to an embodiment.

If a new device or service is added to a first remote network 561 and a RADASync service 531 of an RAS 520 receives an AddRemoteDevice( ) action 551 transmitted by a RADASync CP 510 of the RAC of the first remote network 561, the RADASync service 531 updates a network image corresponding to the first remote network 561. A RADASync CP 532 of the RAS 520 transmits the newly added device or service in the first remote network 561 to an RAC of a second remote network 563 by using an AddRemoteDevice( ) action 552 provided by a RADASync service 540 of the RAC of the second remote network 563. The RAC of the second remote network 563 adds the newly added device or service to its own remote network image.

If a device or service is removed from the first remote network 561 and the RADASync service 531 of the RAS 520 receives a RemoveRemoteDevice( ) action (not shown), the RADASync service 531 updates a network image corresponding to the first remote network 561. The RADASync CP 532 of the RAS 520 transmits the removed device or service in the first remote network 561 to the RAC of the second remote network 563 by using a RemoveRemoteDevice( ) action provided by the RADASync service 540 of the RAC of the second remote network 563. The RAC of the second remote network 563 removes the removed device or service in the first remote network 561 from its own remote network image.

Accordingly, RADA network images of the first remote network 561, a home network 562, and the second remote network 563 are synchronized network images as shown in FIG. 4.

Figure 6:
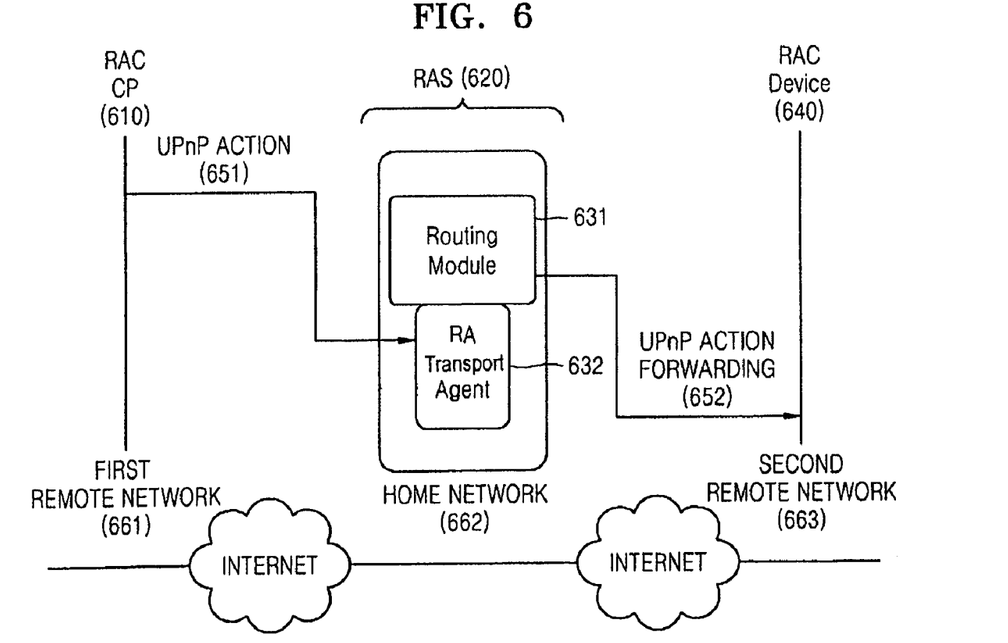
FIG. 6 illustrates a process of routing a UPnP device control action message, which is received from a remote network, to another remote network, according to an embodiment.

FIG. 6 illustrates a process of routing a UPnP device control action message, which is received from a remote network, to another remote network, according to an embodiment.

If a UPnP action 651 received from a UPnP CP 610 of a first remote network 661 is a UPnP action to control a UPnP device of a second remote network 663, a routing module 631 of a RAS 620 of a home network 662 forwards the UPnP action 651 to the RAC 640 of the second remote network 663 (UPnP action forwarding 652. The RAS 620 includes a RATA 632.

The invention can also be embodied as computer readable codes on a computer readable recording medium. The computer readable recording medium is any data storage device that can store data, which can be thereafter read by a computer system. Examples of the computer readable recording medium (including all devices having information process functions) include read-only memory (ROM), random-access memory (RAM), CD-ROMs, magnetic tapes, floppy disks, and optical data storage devices. Devices such as the floppy disks, optical data storages devices, magnetic tapes and any other type of device that inherently provides storage capabilities are computer readable storage media.

While the present invention has been particularly shown and described with reference to embodiments thereof, it will be understood by one of ordinary skill in the art that various changes in form and details may be made therein without departing from the spirit and scope of the present invention as defined by the following claims.

What is claimed is:

1. A communication method of a universal plug and play (UPnP) remote access server (RAS), the communication method comprising:
   accepting a plurality of remote access connections from UPnP devices of a plurality of remote networks;
   collecting device list information comprising information about a network structure of the plurality of remote networks and a network structure of a home network of the RAS, including information about devices discovered in the plurality of remote networks and information about devices discovered in the home network of the RAS, at the RAS;
   generating synchronization information to synchronize the collected device list information between the plurality of remote networks, at the RAS;
   transmitting the synchronization information from the RAS to the UPnP devices of the plurality of remote networks; and
   routing a UPnP device control action message, which is received from a UPnP Control Point of a remote network and controls a UPnP device of another remote network, to the other remote network.

2. The communication method of claim 1, wherein the synchronization information is tree data structure information including a plurality of remote network images and a home network image, the home network image including a list of the devices discovered in the home network, and the plurality of remote network images includes a list of the devices discovered in the plurality of remote networks.

3. The communication method of claim 2, wherein when a device or service is removed from the home network of the RAS device, the RAS device transmits the removed device or service to a remote access client (RAC) of each of the remote networks.

4. The communication method of claim 3, wherein after the RAS device transmits the removed device or service, the RAC of each of the remote networks removes the removed device or service in the home network from its own remote network image.

5. The communication method of claim 2, wherein when a device or service is added to a first of the remote networks, the RAS device transmits the added device or service to a remote access client (RAC) of a second of the remote networks, and the RAC of the second remote network adds the added device or service to its own remote network image.

6. The communication method of claim 1, wherein the collecting of the device list information comprises:
   receiving device list information about the devices discovered in the plurality of remote networks from the UPnP Control Points of the plurality of remote networks; and
   collecting device list information about the devices discovered in the home network.

7. The communication method of claim 1, wherein the collecting of the device list information, the generating of the synchronization information, and the transmitting of the synchronization information are re-performed when a change occurs in the discovered device list information due to a new UPnP device joining or an existing device leaving the plurality of remote networks or the home network.

8. The communication method of claim 1, wherein the UPnP devices are UPnP remote access clients (RACs) or UPnP RASs.

9. The communication method of claim 1, wherein the accepting of the plurality of remote access connections and the transmitting of the synchronization information are selectively performed depending on user settings.

10. The communication method of claim 1, wherein the routing of the UPnP device control action message is selectively performed depending on user settings.

11. A recording medium having embodied thereon a computer program to cause a computer to execute the communication method of claim 1.

12. The communication method of claim 1, wherein the accepting a plurality of remote access connections from UPnP devices of a plurality of remote networks includes connecting the home network with a first remote network using one virtual private network (VPN) tunnel.

13. A universal plug and play (UPnP) remote access server (RAS) device, comprising:
   a microprocessor;
   a connection accepting unit to accept a plurality of remote access connections from UPnP devices of a plurality of remote networks;
   an information collecting unit to collect device list information comprising information about a network structure of the plurality of remote networks and a network structure of a home network of the RAS device, the device list information including information about devices discovered in the plurality of remote networks and information about devices discovered in the home network of the RAS device;
   a synchronization information generating unit to generate synchronization information to synchronize the device list information between the plurality of remote networks;
   a synchronization information transmitting unit to transmit the synchronization information to the UPnP devices of the plurality of remote networks; and
   a routing module to route a UPnP device control action message, which is received from a UPnP Control Point of a remote network and controls a UPnP device of another remote network, to the other remote network,
   wherein at least one of the connection accepting unit, the information collecting unit, the synchronization information generating unit and the synchronization information transmitting unit use the microprocessor to accept the plurality of remote access connections, to collect device list information, to generate synchronization information or to transmit the synchronization information.

14. The UPnP RAS device of claim 13, wherein the synchronization information is tree data structure information including a plurality of remote network images and a home network image, the home network image including a list of the devices discovered in the home network, and the plurality of remote network images including a list of the devices discovered in the plurality of remote networks.

15. The UPnP RAS device of claim 13, wherein the information collecting unit receives device list information about devices discovered in the plurality of remote networks from UPnP Control Points of the plurality of remote networks, and collects device list information about devices discovered in the home network.

16. The UPnP RAS device of claim 13, wherein the information collecting unit, the synchronization information generating unit, and the synchronization information transmitting unit re-perform an information collecting process, a synchronization information generating process, and a synchronization information transmitting process when a change occurs in the discovered device list information due to a new UPnP device joining or an existing UPnP device leaving the plurality of remote networks or the home network.

17. The UPnP RAS device of claim 13, wherein the UPnP devices are UPnP remote access clients or UPnP RAS devices.

18. The UPnP RAS device of claim 13, wherein the connection accepting unit selectively accepts the plurality of remote access connections depending on user settings, and the synchronization information transmitting unit selectively transmits the synchronization information depending on the user settings.

19. The UPnP RAS device of claim 13, wherein the routing module selectively routes the UPnP device control action message depending on user settings.

20. The UPnP RAS device of claim 13, wherein the connection accepting unit connects the home network with a first remote network using one virtual private network (VPN) tunnel.

* * * * *